Oct. 30, 1951  M. B. MOORE ET AL  2,573,130
ELECTRICAL TIMER
Filed Oct. 27, 1944  9 Sheets-Sheet 3

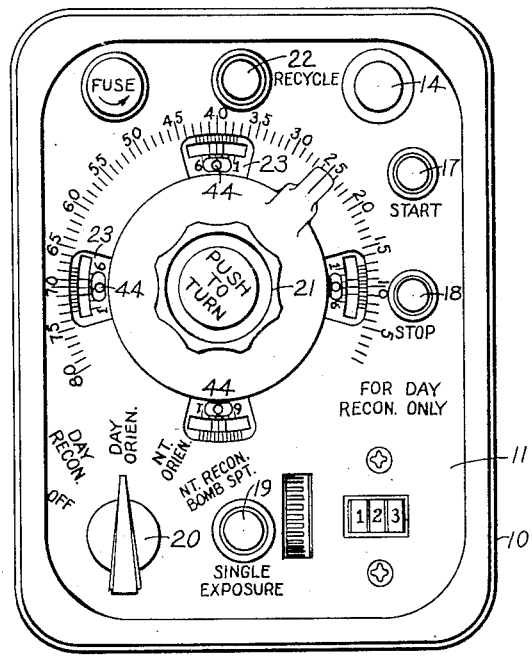
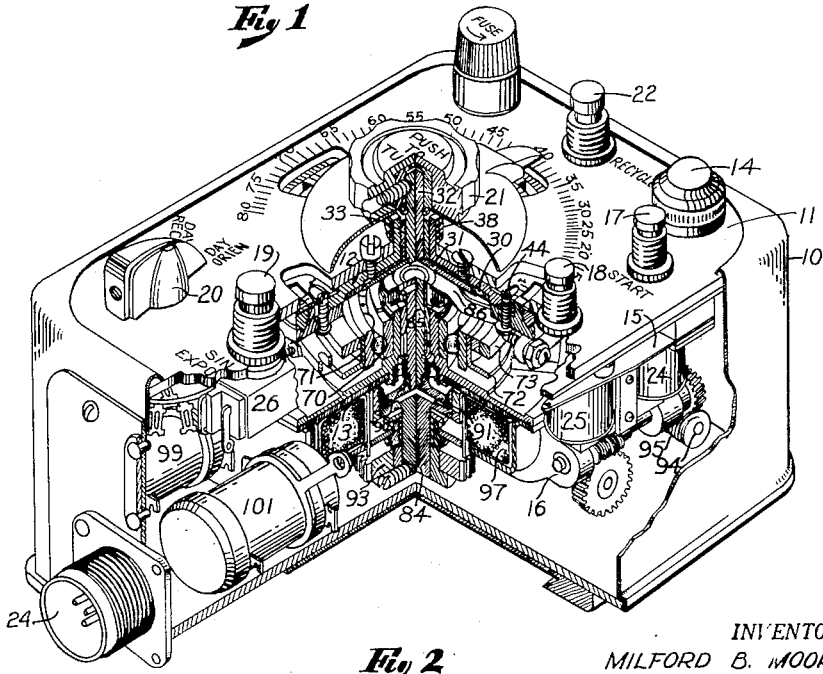

INVENTORS
MILFORD B. MOORE
ELLSWORTH D. WILLIS
ROBERT L. GINTHER
BY Carroll R. Taber Oct. 30, 1951     M. B. MOORE ET AL     2,573,130
ELECTRICAL TIMER Filed Oct. 27, 1944

INVENTORS
MILFORD B. MOORE
ELLSWORTH D. WILLIS
ROBERT L. GINTHER

BY Carroll R. Tober

INVENTORS
MILFORD B. MOORE
ELLSWORTH D. WILLIS
ROBERT L. GINTHER

BY Carroll R. Jabu

Oct. 30, 1951  M. B. MOORE ET AL  2,573,130
ELECTRICAL TIMER

Filed Oct. 27, 1944  9 Sheets-Sheet 7

DURATION OF CLOSURE

INVENTORS
MILFORD B. MOORE
ELLSWORTH D. WILLIS
ROBERT L. GINTHER

BY Carroll R. Faber

Oct. 30, 1951     M. B. MOORE ET AL     2,573,130
ELECTRICAL TIMER

Filed Oct. 27, 1944

INVENTORS
MILFORD B. MOORE
ELLSWORTH D. WILLIS
ROBERT L. GINTHER

BY Carroll R. Taber

Patented Oct. 30, 1951

2,573,130

UNITED STATES PATENT OFFICE 2,573,130

ELECTRICAL TIMER

Milford B. Moore, Lansing, Ellsworth D. Willis, Okemos, and Robert L. Ginther, Lansing, Mich., assignors to Talbert Abrams, doing business as Abrams Instrument Company, Lansing, Mich.

Application October 27, 1944, Serial No. 560,616

6 Claims. (Cl. 161—1)

This invention relates to automatic timers and more particularly to electrical timers, sometimes called "intervalometers," adapted to make and break electric circuits at predetermined intervals.

The timer is designed to operate in conjunction with aerial cameras for the purpose of controlling the automatic operation of the camera and the interval between successive camera exposures. Specifically, when the timer is operating in a properly connected photographic installation, a tripping circuit is closed in accordance with the performance requirement of each of four modes of functioning, namely: day reconnaissance, day orientation, night orientation, and night reconnaissance or bomb spotting. These modes will be made clear as the description proceeds.

The principal object of the present invention is to provide in a single automatic timer means for selectively actuating the camera in all four of these various modes.

A further object of the invention is to provide an automatic timer of this character which can also be manually controlled at any time during any one of the automatic cycles of operation.

A still further object is to provide a timer in which the camera can be manually controlled regardless of whether or not the timer is set to operate automatically.

A further object is to provide a timer, the operating parts of which are contained within a housing and in which certain of the actuating switches can be adjusted from the front of the housing.

A still further object is to provide a novel adjustable electrical switch.

These objects will more fully appear in the following specification when read in connection with the accompanying drawings, wherein:

Figure 1 is a front elevational view of the timer housing;

Figure 2 is a fragmentary sectional view of the timer shonw in Figure 1;

Figure 12:
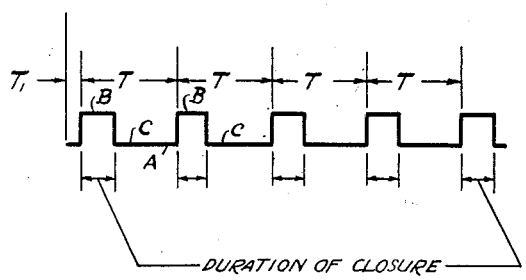
Figure 12 is a diagrammatic representation of the day reconnaissance mode of operation.

Before proceeding with a detailed description of the invention, a brief description of the four modes of functioning of the timer will be given. The four modes are divided into two classes, multi-cycle functioning and uni-cycle functioning. The instrument has only one mode of multi-cycle functioning. That is called day reconnaissance and is illustrated schematically in Figure 12. There are three modes of uni-cycle functioning: day orientation, night orientation, and night reconnaissance and bomb spotting. They are illustrated schematically in Figures 15, 18 and 21, respectively.

The day reconnaissance mode (Figure 12) effects automatically the momentary closure of the controlled, or tripping circuit, repeatedly at regular intervals. The humps B in the line A indicate the duration of closure of the controlled circuit, and the valleys C indicate the time between closures. The interval T is the total time of the cycle and is variable within limits by means of an interval control knob, as will more fully appear presently. The limits may be selected by proper design of the instrument. In one form the limits are 1 and 80 seconds, in ½ second steps. Each interval T represents a complete cycle, which is automatically repeated until a change is made in the dial setting or until the stop control is actuated.

The day orientation mode (Figure 15) is used to close the controlled circuit for the entire selected interval T. This interval is adjustable between the same limits (for instance 1 to 80 seconds) as in the day reconnaissance mode. At the completion of the time interval, the controlled circuit opens, but the timer continues to run for a short predetermined period and then stops. The mechanism then returns to the beginning of the cycle, ready for another cycle, but does not automatically recycle.

The night orientation mode (Figure 18) is much different from that of the previous mode. The indicated time T, which is variable within the limits mentioned, is actually a reference point for two short closures, one occurring $T_a$ seconds before, and the other $T_b$ seconds after the reference point. $T_a$ and $T_b$ are adjustable and $T_0$ is the exposure interval.

The night reconnaissance and bomb spotting mode (Figure 21) is similar to the night orientation mode except that the controlled circuit is closed $T_a$ seconds before and opened $T_b$ seconds after the end of the interval T. Starting and stopping procedures are the same as in the other two uni-cycle modes.

Referring now more particularly to the drawings, and especially those Figures 1 to 8 and 22 which show the details of the mechanism thereof, the invention comprises generally a timing mechanism, a front panel assembly on a front panel 11, and a case 10 or housing therefor. In turn, the timing mechanism comprises generally three sub-assemblies, a front switch frame assembly on a front switch frame 12, a back switch frame assembly mounted on a back switch frame 13, and a power unit designated generally by the numeral 16.

The case and front panel assembly

The case 10 is a rectangular box which may be made of metal or any other suitable material having a large rectangular opening in the front wall thereof. At one end of the case is a 3 prong connector 24 for connection to an external power circuit and the controlled circuit of the camera. The purpose of the connector will appear in connection with the description of the wiring diagrams. Mounted in the opening in the case is a front panel 11 which may be of any suitable material, such as plastic. The front panel carries all of the switches, knobs and dials necessary to operate the timer. It has openings therein for the various actuating knobs for the instrument, such as the start switch knob 17, stop switch knob 18, single exposure switch knob 19, selector switch knob 20, interval selector knob and dial 21, recycle switch knob 22, and a warning light 14. The panel is also provided with four openings 23 adjacent the knob 21 through which adjustment of certain of the switches may be made, as will become more apparent later. In addition, the panel is provided with graduations from 1 to 80 indicating in seconds the interval limits within which the timer is intended to operate.

Figure 9:
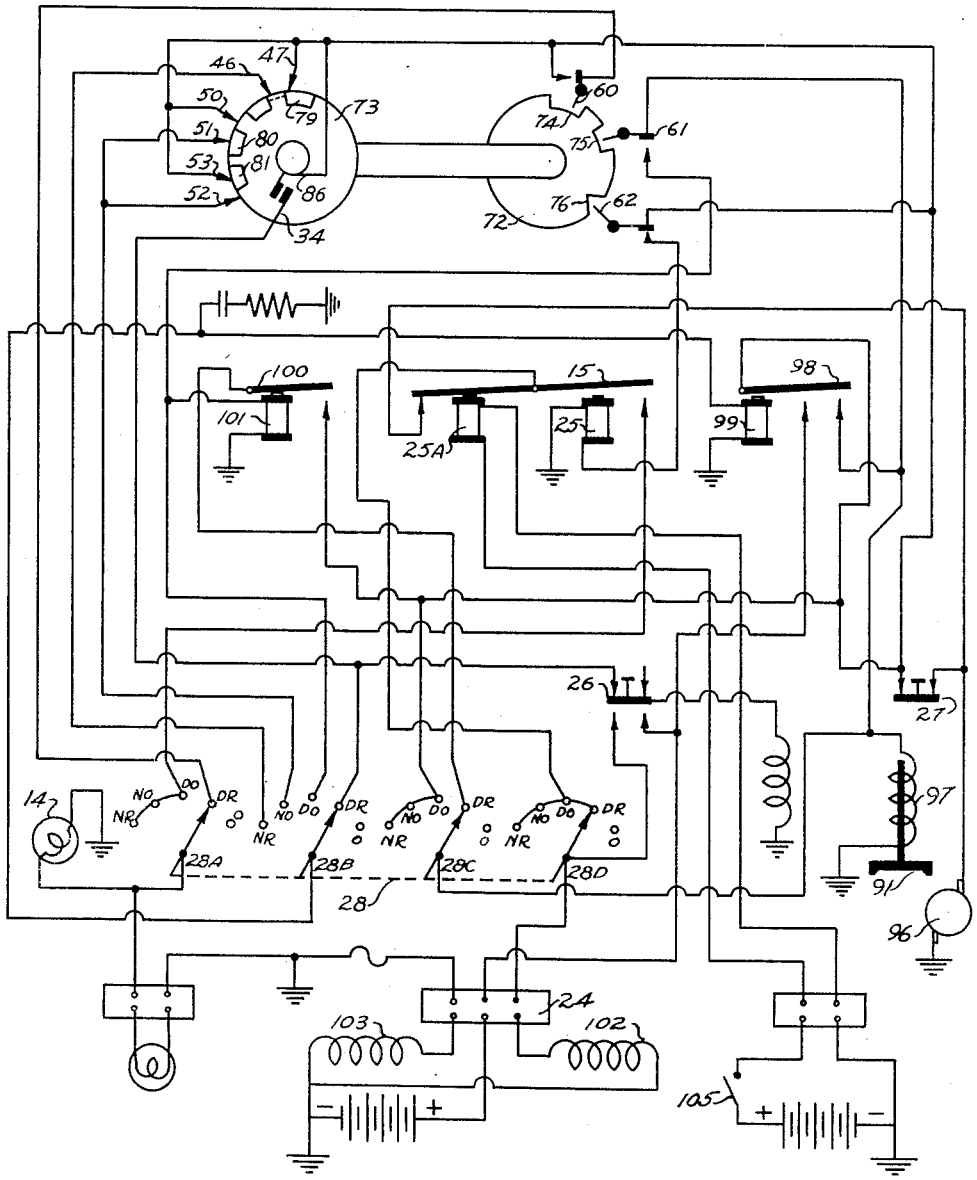
Figure 9 is a complete wiring diagram of the timer.

The start switch knob 17 and stop switch knob 18 are arranged to operate manually a single start-stop switch 15 (Figure 9). The switch 15 is a single pole double throw switch attached to the back of the panel 11. The switch is also thrown to stop or "off" position at certain times automatically by a stop relay coil 25 attached to the switch. The switch 15 may be thrown to start or "on" position by a start relay coil 25A energized by a remote control switch 105.

The single exposure switch knob 19 operates a simple push button switch 26 for manually closing the controlled circuit whenever desired, and during any part of a cycle when the device is set for day reconnaissance.

The recycle switch knob 22 operates another push button switch 27 provided so that at any time during a cycle the controlled circuit may be closed, starting a new cycle, whether the cycle already started has been completed or not.

The selector switch comprises four switch arms 28A, 28B, 28C and 28D coupled together and rotated coincidentally by a shaft 28 on which knob 20 is mounted. Each switch arm is associated with a separate set of contact points labelled N. R., N. O., D. O., and D. R. A fifth contact point labelled O provides an off position. By means of the selector switch the various modes of functioning can be selected. When the selector switch is in the "off" position the instrument cannot function.

The warning light 14 is a small electric bulb mounted on the panel for warning that the controlled circuit is about to be closed, when the instrument is functioning in the day reconnaissance mode; or that the instrument is ready to function in any of the other three modes.

The interval selector knob selects the time T in any of the various modes of functioning.

The front switch frame assembly

Figure 3:
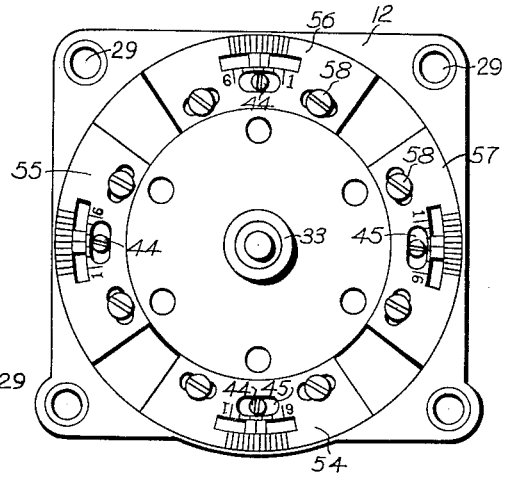
Figure 3 is a front view of the front switch frame assembly
Figure 4:
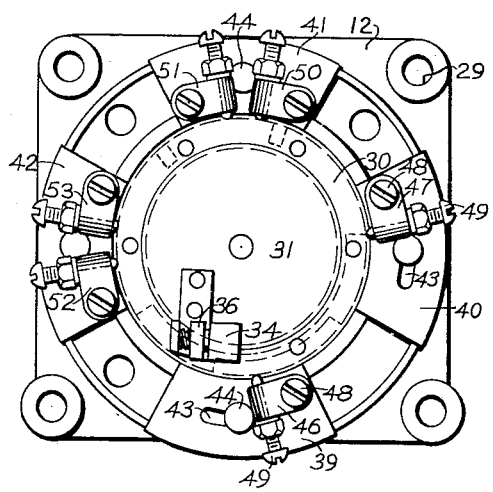
Figure 4 is a back view of the front switch frame assembly.
Figure 7:
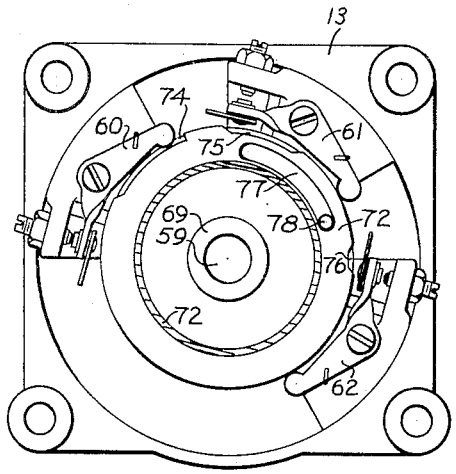
Figure 7 is a front elevational view of the back switch frame assembly with the front switch cam removed.
Figure 8:
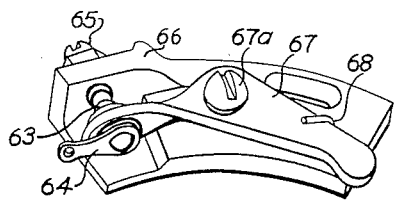
Figure 8 is a pictorial view of one of the rocker switches attached to the back switch frame.

The front switch frame 12 is shown in Figures 3, 4 and 7. The front switch frame is a metallic plate provided with four apertures 29 at the corners thereof adapted to receive attaching studs for connecting the same to the back switch frame and to the rest of the mechanism. Rigidly attached by rivets to the back of the front switch frame is what is called an internal detent gear 30 in the form of an annular ring having notches or teeth on its inner periphery. Within the internal detent is an external detent 31 shown more clearly in Figure 6. The external detent is a flat metallic plate having teeth about its periphery which cooperate with the teeth on the internal detent 30. The detent 31 is provided with a shaft 32 integral therewith which extends through a central hub 39 in the front switch frame and through the front panel of the housing.

The interval selector knob 21 is fixed to the front end of the shaft 32 and a coil spring 38 surrounds the shaft. The spring 38 is located between the knob 21 and panel 11 and biases the knob forwardly away from the panel, at the same time pulling the external detent into mesh with the internal detent. The knob 21 and external detent may be rotated only after pushing in on the knob until the teeth on the detents disengage. When the knob 21 is released the spring 38 pulls the detents into mesh and locks the external detent in place.

Rigidly mounted on the rear face of the detent 31 is a flying arm stop. The stop comprises a small U-shaped bracket 34, a threaded contact screw 35, a collar 36 and a coil spring 37. Holes are provided in both legs of the bracket 34 to slidably receive contact screw 35. The screw is threaded into collar 36. The spring 37 surrounds the contact screw and forces the collar and screw toward the right, as viewed in Figure 6. The purpose of this device will presently appear.

Mounted on the rear of the front switch frame are four switch bases 39, 40, 41 and 42. Each of these bases are generally flat plates of metal in the form of annular segments. Each switch base is provided with an arcuate slot 43 located approximately centrally thereof which receive clamping screws 44. The screws 44 extend forwardly through opening 45 in the front switch frame and corresponding openings 23 in the front panel so as to permit access to the heads of the screws. When these screws 44 are loosened, the switch bases 39 and 42 can be adjusted a limited distance in a circumferential direction about the center of the front switch frame 12.

Pivotally mounted on the switch bases 39 and 40 are contact members 46 and 47. Each of these contact members comprise an insulating arm pivotally attached to its respective switch base by a screw 48. A contact screw 49 is threaded through the end of each of the arms 46 and 47 adjacent their free ends. The contact screws are arranged at right angles to the axes of the screws 48. Small springs surround each of the screws 49 and bias the arms 46 and 47 in clockwise directions, as shown in Figure 4, toward the center of the front switch frame.

On each of the switch bases 41 and 42 are similar contact members 50, 51, 52 and 53. Each of these contact members is identical with the contact members 46 and 47 previously described, but there are two contact members on each of the switch bases 41 and 42. It will also be noted that they are arranged so that their pivot axes are remote from each other and the contact screws are adjacent each other so that they rotate in opposite directions.

The switch assemblies comprising the contact members on the switch bases 39, 40, 41 and 42 constitute the switches for controlling time intervals $T_a$ and $T_b$ for night reconnaissance and $T_a$ and $T_b$ for night orientation, respectively.

On the front of the front switch frame are four graduated mode plates 54, 55, 56 and 57 (see Figure 3), which provide a scale for adjusting the index lines inscribed on protruding lugs on the front of the four switch bases 39, 40, 41 and 42, and are movable therewith when the screws 44 are loosened. The mode plates are secured to the front switch frame by screws 58.

The back switch frame

Figure 5:
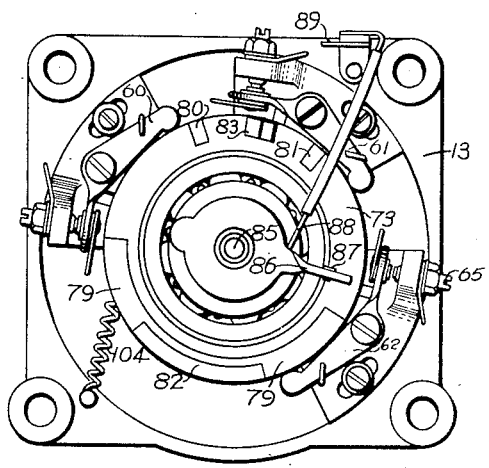
Figure 5 is a front elevational view of the back switch frame assembly showing all operative parts attached thereto.
Figure 6:
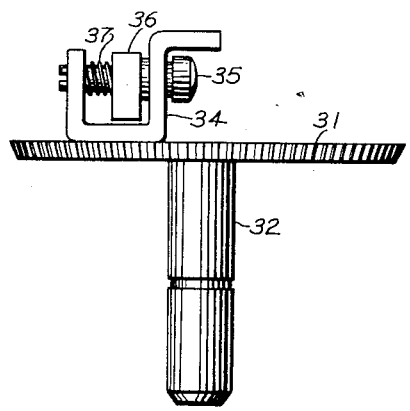
Figure 6 is a side elevational view of the so-called external detent gear and the associated flying arm stop.

The back switch frame assembly is shown in more detail in Figures 5 and 7. It is mounted in rear of the front switch frame and spaced therefrom by means of four studs rigidly connected at opposite ends to the front and back switch frames in the openings 29 provided therefor in the corner of both frames. The back switch frame 13 is composed of a plate of metal or similar material and has a central opening 59 extending therethrough. Three switches are mounted on the front face of the back switch frame. These switches are designated generally by the numerals 60, 61 and 62. The switches 60, 61 and 62 are respectively the recycle cam switch, warning light switch and stop cam switch. The switches are all identical. One is shown in detail in Figure 8. Each switch comprises a base which is fixedly attached to the back switch frame 13 in the manner indicated in Figure 7. A rocker arm 67 is pivotally mounted by means of a screw 67a intermediate its ends on its respective base. One end of each rocker arm carries a contact screw 63 on the radially outer end thereof. The contact is provided with a suitable terminal 64 to which an electrical conductor is connected, as will be disclosed in the wiring diagram to be described later. A contact screw 65 is attached to an upstanding lug 66 on each switch base adjacent the movable contact 63 so that as the rocker arm 67 is moved a limited distance about its pivot the two contacts will make and break a connection therebetween. A small wire spring 68 is firmly attached at one end to the screw 65 and has a hook shaped end which engages the rocker arm 67 opposite the contact 63. This spring 68 tends to move the contact 63 toward closed position against contact 65.

In the center of the back switch frame 13 is an annular hub 69 which surrounds the opening 59 and extends toward the front of the timer, as will be clearly apparent in Figure 2. A ball bearing surrounds the hub 69. The inner race 70 is fixedly attached to the hub. The outer race 71 of the bearing carries a pair of cams 72 and 73. See Figures 7 and 5, respectively. These are designated as back switch cam and front switch cam, respectively. The two cams are annular, are axially spaced from each other, and are fixedly attached to the outer race 71 of the ball bearing. The back switch cam 72 is a disk type cam having three notches 74, 75 and 76 in its periphery. The cam is also provided with an arcuate slot 77. A pin 78 for limiting the movement of the cam is attached to the back switch frame and extends through slot 77. The cam 72 is arranged in the plane of the ends of the rocker arms 67 so that as the cam is rotated the rocker arms are moved into and out of contact with the respective fixed contacts 65.

The front cam 73 is an annular ring of electrical insulating material so arranged on the outer race 71 of the ball bearing that when the two switch frames 12 and 13 are assembled the cam 73 lies in the planes of the contact screws 49 on the front switch frame. The cam 73 contains three metallic inserts 79, 80 and 81 inserted in suitable notches in the cam ring. The inserts 80 and 81 are small rectangular blocks of metal with their radially outer ends forming a portion of the outer periphery of the cam 73. The insert 79 is of relatively great length in a circumferential direction and is provided with a recess 82 midway between its ends which is filled with non-conducting material. Thus, it will be seen from examination of Figure 5 that the insert 79 has two spaced switch contact portions which are connected in series by a non-contacting portion.

A lug 83 of insulating material is either formed integrally with the cam 73 or is rigidly attached thereto. The lug projects axially forward from the front switch cam 73. This lug constitutes part of the means for driving the cam when the instrument is in operation. A coil spring 104 is connected at one end to the cam 72 and at the other end to the back switch frame.

The means for driving or rotating the cams 72 and 73 comprise the above mentioned power unit 16, including a driving shaft 84, a driven shaft 85, and a flying arm 86. The driven shaft 85 is mounted in a suitable ball bearing rotating within the hub 69 on the back switch frame. The front end of the driven shaft 85 carries a flying arm 86 which is rigidly attached thereto and is mounted in the plane of the driving lug 83 so that upon rotation of the flying arm in a clockwise direction the latter will contact the driving lug and rotate the cams 72 and 73 in a clockwise direction. The free end of the flying arm carries a contact 87, the purpose of which will appear presently. A long torsion spring 88 is attached at one end to a bracket 89 on the back switch frame 13. The spring 88 is wrapped about the driven shaft several times and its inner end is rigidly connected to the driven shaft. The spring is so arranged that it tends to rotate the flying arm 87 in a counter-clockwise direction as viewed in Figure 5.

The power unit

The rear end of the driven shaft carries the male member 90 of a cone clutch. The forward end of the driving shaft 84 carries the female element 91 of this same cone clutch. The two parts of the clutch are engaged or disengaged by the axial movement of the driving shaft 84 which is mounted in suitable bearings in a solenoid coil housing 92 attached to the back switch frame. The driving shaft 84 is also rotatably mounted in said bearings. The rear end of the driving shaft 84 carries a pinion gear 93 which is rigidly attached thereto. This gear constitutes the final gear in a reduction gear train which connects a small constant speed electric motor 96 to the driving shaft 15. The motor is shown only in the wiring diagram Figure 9. Its drive shaft 94 and worm 95, however, are shown in Figure 2.

A solenoid coil 97 is carried in the solenoid housing 92 and surrounds the driving shaft 84. This coil is so arranged that when it is energized it moves the driving shaft 84 in an axial direction toward the driven shaft 85 so as to engage the two parts 90 and 91 of the cone clutch and thereby rotate the driven shaft whenever the motor 96 is running. When the solenoid is de-energized, the two parts of the cone clutch are separated and the driven shaft stops rotating even though the driving shaft continues to be rotated by the motor 96.

Although not truly a part of the power unit, two relays are mounted on the clutch solenoid coil housing. They are mounted there purely for convenience. The two relays are the camera relay 98 and the holding relay 100 (see Figures 2 and 9). The camera relay 98 is a double pole switch operated by a solenoid coil 99. The holding relay 100 is a single pole switch operated by a solenoid coil 101. Their functions will appear presently.

The electrical connections

The various parts of the mechanism are connected together as illustrated in the wiring diagram of Figure 9. All wiring shown is located within the case except the two external circuits 102 and 103 below the connector 24, which is shown diagrammatically. The circuit 102 is the controlled circuit or the tripping circuit of the camera. The circuit 103 is the power circuit which furnishes electrical current to energize the timer and the controlled circuit.

The wiring is self-explanatory and no detailed description need be given here. Also the selector switch points are indicated by letters NR, NO, DO, DR and O, representing respectively the switch settings for the "night reconnaissance," "night orientation," "day orientation," "day reconnaissance," and "off" positions. The different operating circuits will become apparent as the description of the operation proceeds.

Operation—General

Ordinarily before the instrument is set into operation, the time interval T is first selected by means of the interval selector knob 21. To do that, the knob 21 is pushed in until the teeth on the detents 30 and 31 disengage. The knob is then rotated until the pointer on the knob indicates the desired time interval T. Rotating the knob 21 also rotates the external detent 31 and the flying arm stop 34. In turn, the flying arm stop 34 pushes the flying arm 86 ahead of it, if rotated clockwise, or permits spring 88 to pull the flying arm in a counter-clockwise direction if the knob 21 is rotated in a counterclockwise direction. Thus the flying arm is moved nearer to, or farther away from, the driving lug 83 on the front cam 73. In that way the distance that the flying arm has to move to pick up the driving lug 83 and start rotating the cams is decreased or increased respectively. The decrease or increase in distance causes a corresponding decrease or increase in time of movement of the flying arm after clutch 90—91 engages and before the cams begin to rotate. As above pointed out the time may be varied within limits (1 to 80 seconds).

The mode selector switch 28 is set for the desired mode of operation, and the start switch button 17 is pressed to close the start switch.

Day reconnaissance mode

Assuming that the mode selector switch 28 is set for day reconnaissance, when the start switch 15 is actuated the motor circuit is closed, thereby starting the motor 96. Simultaneously the circuit of the camera relay 99 is closed through the flying arm 86 and contact 35 on the flying arm stop to actuate the double pole relay switch 98, closing the controlled circuit. At the same time the other pole of the camera relay switch completes circuits through the clutch solenoid coil 97 and the recycle cam switch and holding relay coil 101. The circuit of the holding relay coil is arranged so that when the holding relay 100 is closed, it is locked, maintaining the circuit through the clutch coil 97 until a later opening of the recycle cam switch 60 releases it.

When the clutch coil 97 is energized the meshing of the male and female parts of the clutch completes the drive train from the motor through the drive gears, driving shaft 84 and driven shaft 85 to the flying arm 86. (Incidentally, this takes up to $\frac{1}{10}$ second, designated $T_1$, and occurs only on the first cycle.) The flying arm then begins to rotate leaving the flying arm stop 34. The contact 35 on the flying arm stop is pushed by the spring 37 along with the flying arm for a short distance until the collar 36 strikes the bracket 34. The distance the contact 35 moves, and the speed with which it moves (the same as the speed or rotation of the flying arm) are such as to take .25 second and thereby maintain the controlled circuit closed for that length of time.

Figure 11:
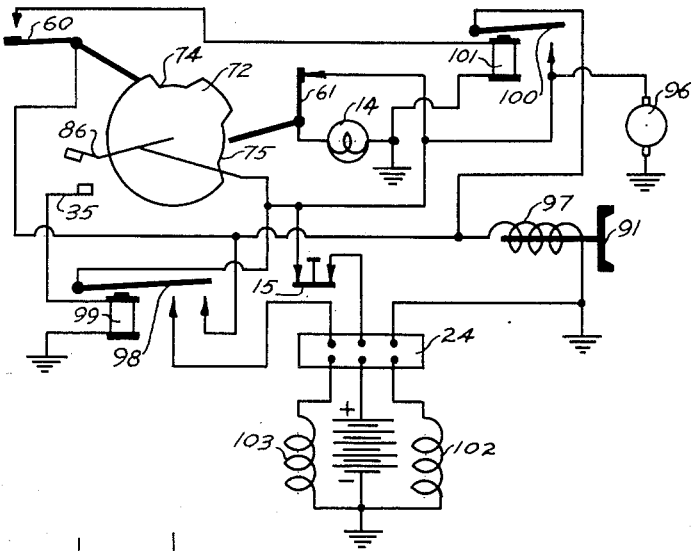
Figure 11 is a similar wiring diagram showing the parts at the end of the cycle.

The flying arm then moves away from the flying arm stop contact 35 breaking the controlled circuit, and continues to rotate through a predetermined angular distance. This angular distance depends upon the position of the flying arm stop which is set by the interval adjusting knob 21 to the desired time mark. The flying arm picks up the driving lug 83 on the front cam disk 73 and begins to rotate the cam disks simultaneously. While both cams rotate, only the back cam 72 and its associated switches function in the present mode of operation. The cam surface 75 for the warning light switch 61 actuates the switch 61 about 2 seconds before the cam surface 74 actuates the recycle cam switch 60, to warn the operator that approximately 2 seconds remain before a closure will be made in the controlled circuit. The cam then opens the recycle cam switch 60 (Figure 11), breaking the circuit through the holding relay 100 to the clutch coil 97. This allows the clutch to disengage springs 88 and 104 then return the flying arm and cam disks to their starting positions.

Figure 10:
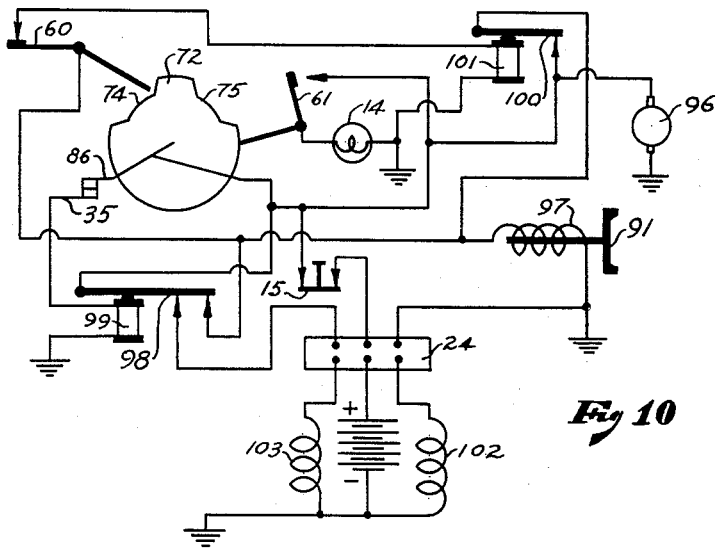
Figure 10 is a simplified wiring diagram showing those circuits only which are used during the day reconnaissance mode of operation, at the beginning of the cycle.

The flying arm strikes the flying arm stop contact 35 on the flying arm stop bracket, again completing the circuit through the camera relay coil 99 and creating another impulse in the controlled circuit. At the same time, the other circuits are closed as previously described and illustrated in Figure 10 starting another cycle of operation. The cycle is repeated at the predetermined intervals T (Figure 12) until the instrument is stopped by opening the start-stop switch 15.

*Day orientation mode*

Figure 13:
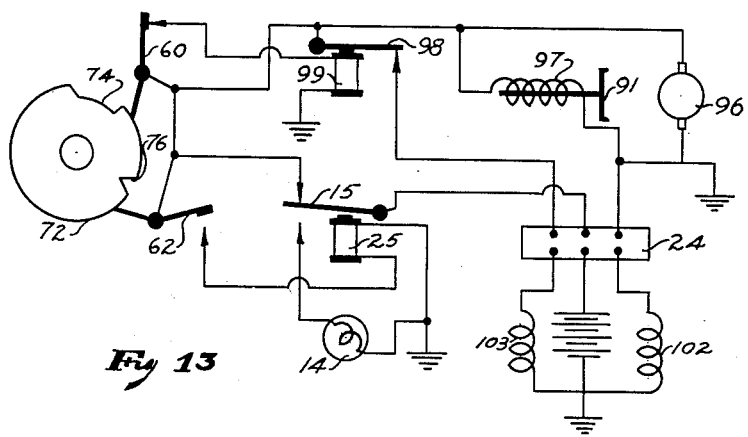
Figures 13 and 14 are respectively simplified wiring diagrams at the beginning and end of the cycle for the day orientation mode.
Figure 14:
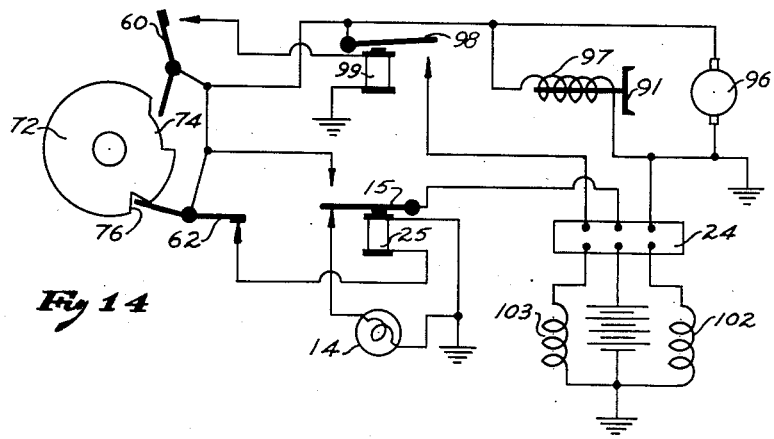
Figure 15:
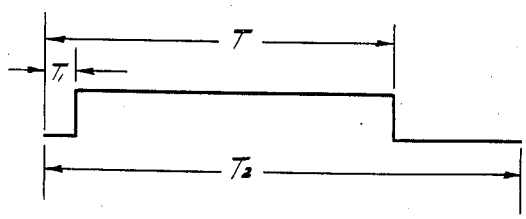
Figure 15 is a diagrammatic representation of the operation of the invention in the day orientation mode.

The day orientation mode is employed to close the controlled circuit for the entire interval selected by the knob 21 as indicated diagrammatically in Figure 15. The circuits are shown in Figures 13 and 14. The same switch 60 that caused recycling in the previous mode is used to open the controlled circuit. However, no recycling takes place and the instrument continues to run until the stop cam switch 62 is tripped.

When the start-stop switch 15 is put in a start position the camera relay coil 99 closes switch 98 which remains closed as the cam disk advances. The motor 96 is started and clutch coil 97 causes the clutch faces to engage. At the same time the controlled circuit 102 is closed. The flying arm moves through the predetermined time interval T, picking up the driving lug 83 and rotating cam disks 72 and 73. At the end of the predetermined interval T, the notch 74 in the cam 72 opens switch 60, and opens the controlled circuit 102. The motor continues to run, however, until notch 76 in cam 72 closes stop cam switch 62. That closes the circuit of the stop relay coil 25, opening the start-stop switch 15 and the motor stops, clutch coil 97 releases the clutch and the flying arm 86 and cam disks 72 and 73 are returned to start positions, ready for another cycle.

The warning light 14 comes on after the cycle is completed, and remains on until the start-stop switch is again placed in start position. It denotes that the timer is ready for the next cycle of operation.

*Night orientation*

Figure 16:
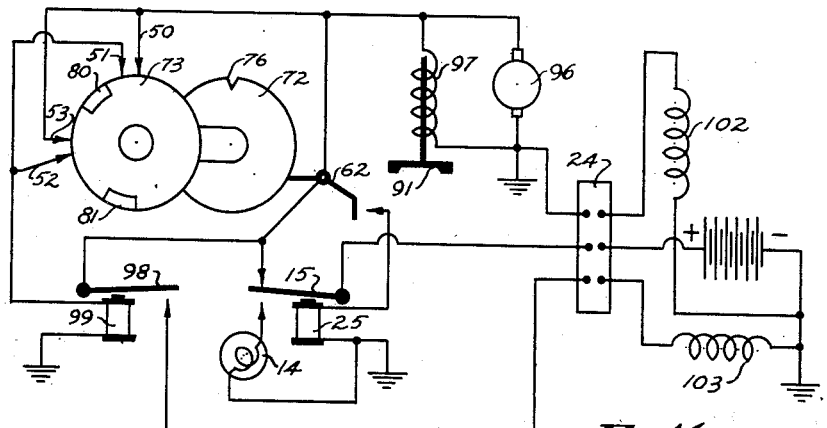
Figures 16 and 17 are respectively simplified wiring diagrams at the beginning and end of the cycle in the night orientation mode of operation.
Figure 17:
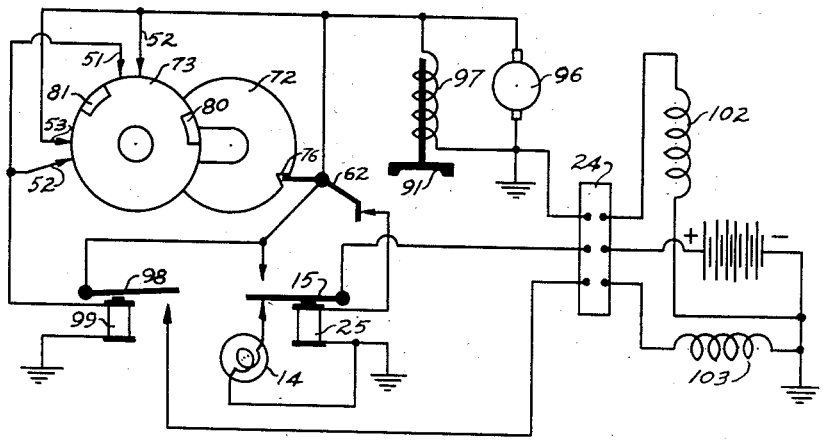
Figure 18:
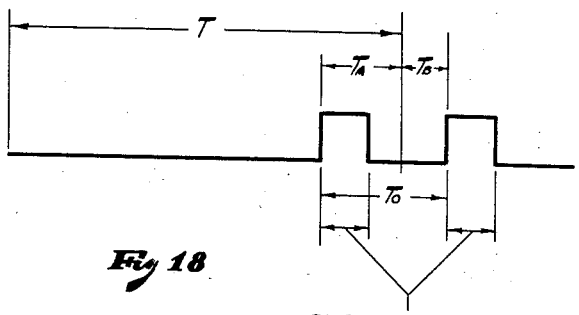
Figure 18 is a diagrammatic representation of the mode of operation of the invention in the night orientation mode.

This mode is shown in Figures 16 to 18. With the time T set by knob 21 and the selector switch set to position NO, the start button 17 is pressed, closing switch 15. The motor 96 is started and clutch control relay 97 is closed. The flying arm 86 begins to rotate and after a predetermined time picks up the cam driving lug 83 to rotate the cams 72 and 73. A short time after the cams begin to rotate, and a time interval $T_a$ before time T, both contacts 52 and 53 touch insert 81 in the cam disk 73, momentarily closing the circuit of camera relay 99 which in turn closes the controlled circuit 102. This closure is very short because the insert 81 soon moves away from contact 52, breaking the camera relay circuit. Some interval later (T plus $T_b$) contacts 50 and 51 touch insert 80, again momentarily closing the camera relay circuit which in turn closes the controlled circuit. Both of these closures are approximately .25 of a second.

The timer continues to run until the notch 76 in cam 72 actuates the stop cam switch 62, closing the circuit of relay coil 25 and opening the start-stop switch 15. The timer then stops and the flying arm 86 and cam disks 72 and 73 return to start position.

*Night reconnaissance and bomb spotting*

Figure 19:
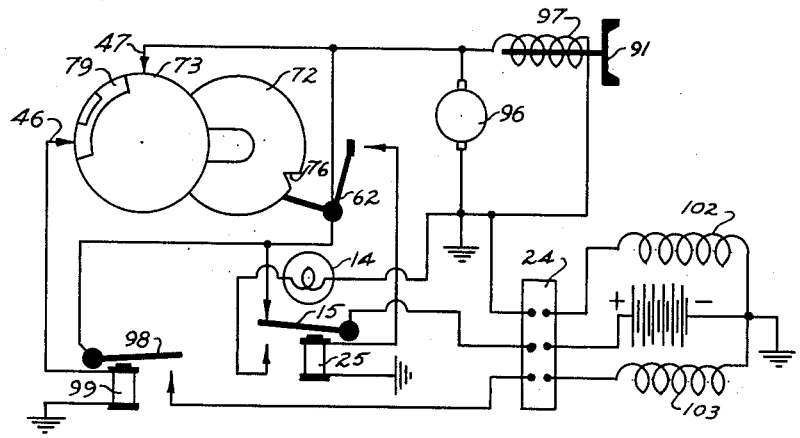
Figures 19 and 20 are respectively simplified wiring diagrams of the invention when employed in the night reconnaissance or bomb spotting mode of operation.
Figure 20:
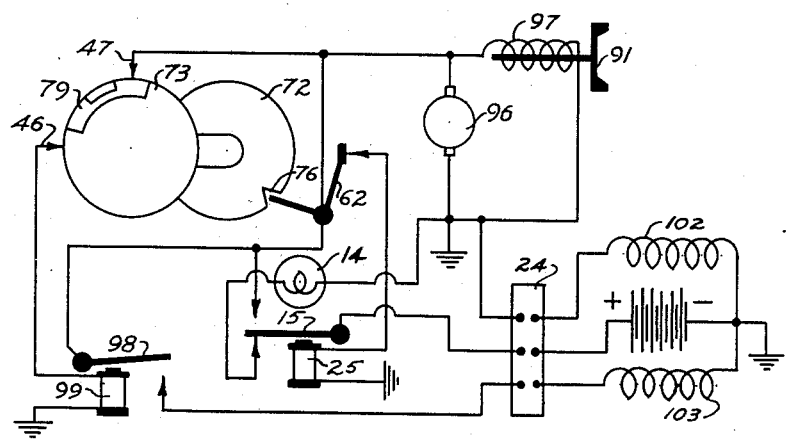
Figure 21:
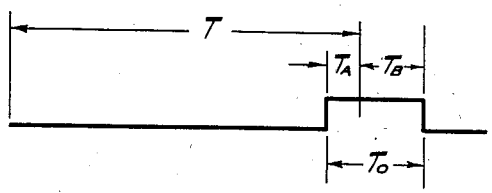
Figure 21 is a diagrammatic representation of the operation of the invention in the night reconnaissance mode of operation.
Figure 22:
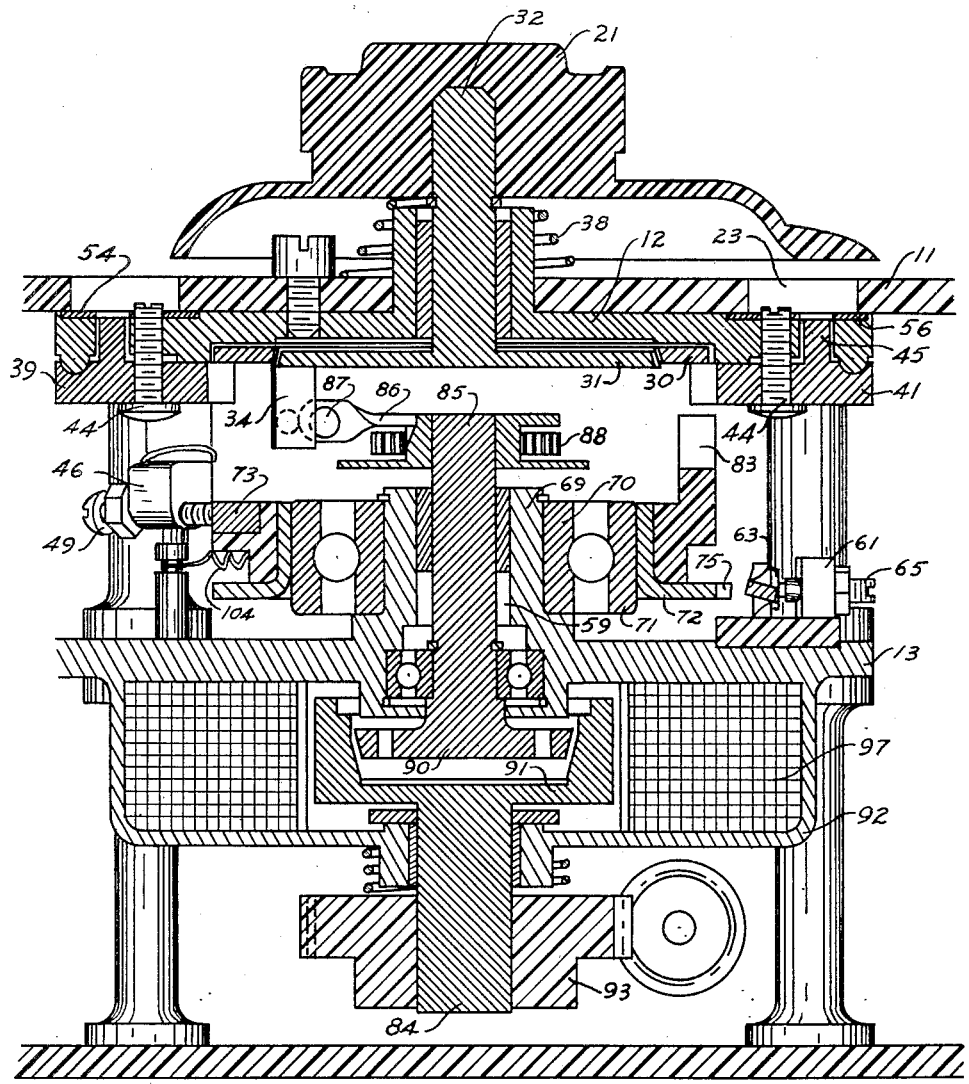
Figure 22 is a fragmentary cross-sectional view taken through the axis of the knob 21 and looking in a direction toward the right of the instrument as viewed in Figure 1.

This mode of operation is shown in Figures 19 to 21. It is practically the same as the previously described mode, except that instead of two spaced apart short closures, a single long closure is made.

Instead of contacts 50 to 53 and inserts 80 and 81, the single insert 79 and contacts 46 and 47 are in circuit. It is evident, therefore, that the camera relay circuit is closed during the time that both contacts touch the insert, which begins $T_a$ seconds before, and then ends $T_b$ seconds after, the interval T selected by the interval selector 21.

As has been pointed out heretofore, the switch bases 39, 40, 41 and 42 for the switches used in the last two modes are adjustable on the front switch frame 12. By adjusting the switch bases, the contact members 46, 47, 50, 51, 52 and 53 can be moved a limited distance relative to the cam 73. By this means the time intervals $T_a$ and $T_b$ in the night orientation and night reconnaissance and bomb spotting modes can be varied. In one specific design of the invention this variation is between 1 to 6½ seconds.

From the foregoing it will be seen that this invention provides in a single timer means for selectively actuating a camera in four different modes. The time of the cycle can be very easily and quickly varied. Also, the intervals $T_a$ and $T_b$, in the last two modes, can be conveniently adjusted without disassembling any part of the instrument. The adjusting screws 44 are readily accessible from the front of the timer.

The arrangement of the pivoted arms of the switch contact members 46, 47, 50, 51, 52 and 53 and the contact screws 49 thereon provides very accurate adjustment of the controlled circuit closure time in both night modes of operation.

Furthermore, provision is made for manually controlling the timer regardless of its automatic operation.

The scope of the invention is indicated in the appended claims.

We claim:

1. In a device of the character described, a support, a radial arm fixed to a driven shaft rotatably mounted on said support, a drive shaft coaxial with said driven shaft for rotating said arm in one direction, said means comprising a releasable clutch arranged coaxially of said shafts, electro-magnetic means for operating said clutch, means associated with said arm for rotating said arm in the opposite direction when said clutch is released, a stop adjustably mounted on said support and engageable with said arm to limit the rotary movement of said arm in the opposite direction, a cam rotatably mounted on said support, means fixed to said cam and engageable by said arm after a predetermined rotation of the latter in said one direction for rotating said cam, means associated with said cam for rotating the latter in the opposite direction when released from said driving means, and a switch in series with said electro-magnetic means mounted on said support adjacent said cam and adapted to be actuated thereby upon a predetermined movement of said cam.

2. In a device of the character described, a support, a driven shaft rotatably mounted on the support, a continuously rotatable drive shaft arranged coaxially of said driven shaft and means for rotating the same in one direction only mounted on said support, cooperating clutch members arranged coaxially of said shafts for releasably connecting and disconnecting said shafts, a cam rotatably mounted on said support, a drive pin rigid with said cam, a radial arm fixed to said driven shaft and engageable with said drive pin upon a predetermined rotation of said driven shaft relative to said cam, spring means connected to said driven shaft and said support for rotating said driven shaft when released by said clutch in a direction opposite to that in which it is driven by the drive shaft, a stop mounted on said support for limiting the return movement of said arm, said stop being adjustable on said support to vary the position of said arm when engaging said stop.

3. In a device of the character described, a support, a disk of electrically non-conductive material rotatably mounted on said support, an electrically conductive insert in said disk, a pair of arms extending toward each other and pivotally mounted on said support at their ends remote from each other on axes parallel to the axis of rotation of said disk, a contact on each arm extending toward said disk and engageable with the conductive insert in said disk as the latter rotates, said contacts being adjustable relative to said arms toward and away from said disk.

4. In a device of the character described, a support, a disk of electrically non-conductive material rotatably mounted on said support, an electrically conductive insert in said disk, a pair of arms extending toward each other and pivotally mounted on said support at their ends remote from each other on axes parallel to the axis of rotation of said disk, a contact screw in the plane of the disk threaded through each arm remote from their pivots and engageable with said conductive insert as said disk rotates, said contacts being adjustable relative to said arms toward and away from said disk.

5. In a device of the character described, a support, a motor, a cam driving member rotatably mounted on said support, means connecting said motor to said member for rotating the latter in one direction, said means including an electrically operated releasable clutch, a cam rotatably mounted on said support, means on said cam engageable with said member upon a predetermined rotation thereof for rotating same cam a limited distance, switch means mounted on said support and in circuit with said clutch for actuating the same, said switch means being operable by said cam upon a predetermined rotation thereof, and an adjustable stop for varying the initial position of said member whereby to vary the angular rotation of said member before engagement with said means on said cam, said stop comprising a contact movable a limited distance in the direction of rotation of said member and engageable by the latter when said member is in its initial position.

6. In a device of the character described, a support, an oscillatory switch operating element on said support, a switch associated therewith for operation thereby, means for oscillating said switch operating element comprising a rotatable member engageable and disengageable with said switch operating element, means for rotating said member in one direction from a predetermined start position to a position wherein it engages said switch operating member and moves the latter to switch opening position, additional means for returning said member to said start position after said switch has been opened, and a stop adjustably mounted on said support and engageable with said switch operating member when the latter is in start position, said stop being adjustable to vary said predetermined start position, said stop comprising a bracket, a contact movable in said bracket in the direction of movement of said switch operating member, means on said contact cooperating with said bracket for limiting the movement of said contact, and spring means associated with said contact for biasing the latter toward said limiting position.

MILFORD B. MOORE.
ELLSWORTH D. WILLIS.
ROBERT L. GINTHER.

REFERENCES CITED

The following references are of record in the file of this patent:

UNITED STATES PATENTS

| Number | Name | Date |
|---|---|---|
| 908,117 | Murray | Dec. 29, 1908 |
| 1,483,433 | Hall | Feb. 12, 1924 |
| 1,603,049 | Hall | Oct. 12, 1926 |
| 1,835,917 | Vickery | Dec. 8, 1931 |
| 1,919,969 | Travers | July 25, 1933 |
| 2,025,511 | Johnson | Dec. 24, 1935 |
| 2,100,284 | Kriechbaum | Nov. 23, 1937 |
| 2,123,063 | Peters | July 5, 1938 |
| 2,143,692 | Haar | Jan. 10, 1939 |
| 2,166,683 | Grayson | July 18, 1939 |
| 2,200,110 | Andersen | May 7, 1940 |
| 2,223,207 | Ellis | Nov. 26, 1940 |
| 2,261,158 | Holliday | Nov. 4, 1941 |
| 2,269,973 | Hathaway | Jan. 13, 1942 |
| 2,272,568 | Little | Feb. 10, 1942 |
| 2,274,371 | Kucera | Feb. 24, 1942 |
| 2,317,120 | Tambun et al. | Apr. 20, 1943 |
| 2,370,727 | Holden | Mar. 6, 1945 |
| 2,388,686 | Habig | Nov. 13, 1945 |